Oct. 31, 1972     C. W. PIERCE     3,701,670
INFRARED MICRONIZING COOKER
Filed May 6, 1971     2 Sheets-Sheet 1
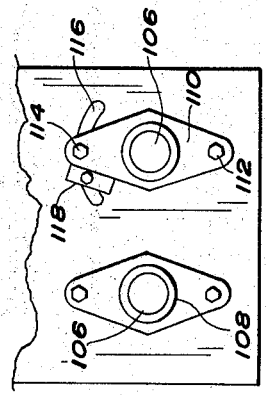
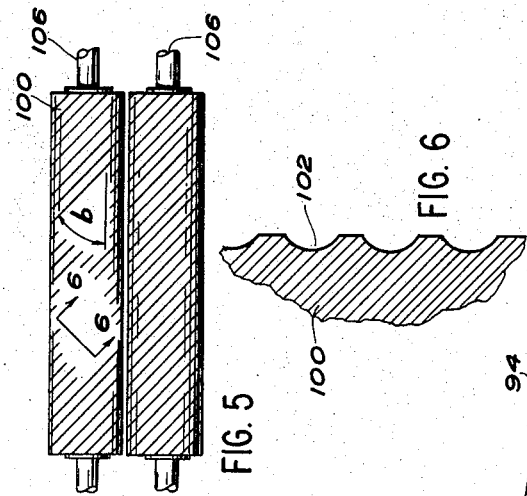
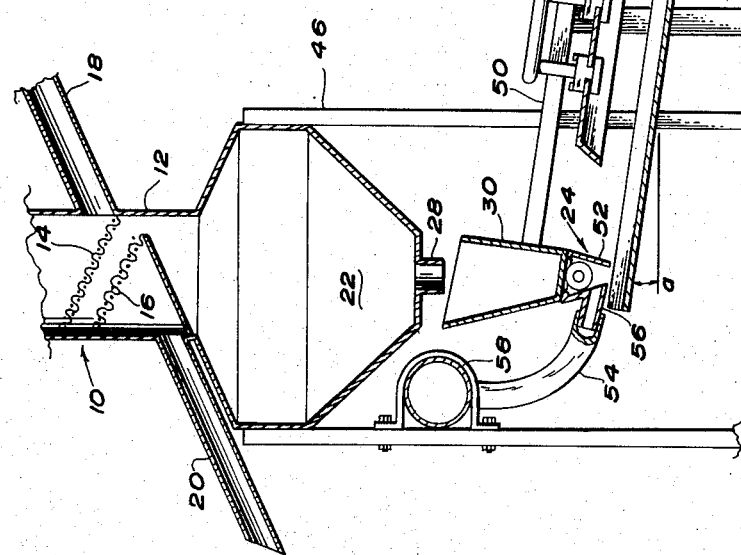
CHARDO W. PIERCE
INVENTOR.

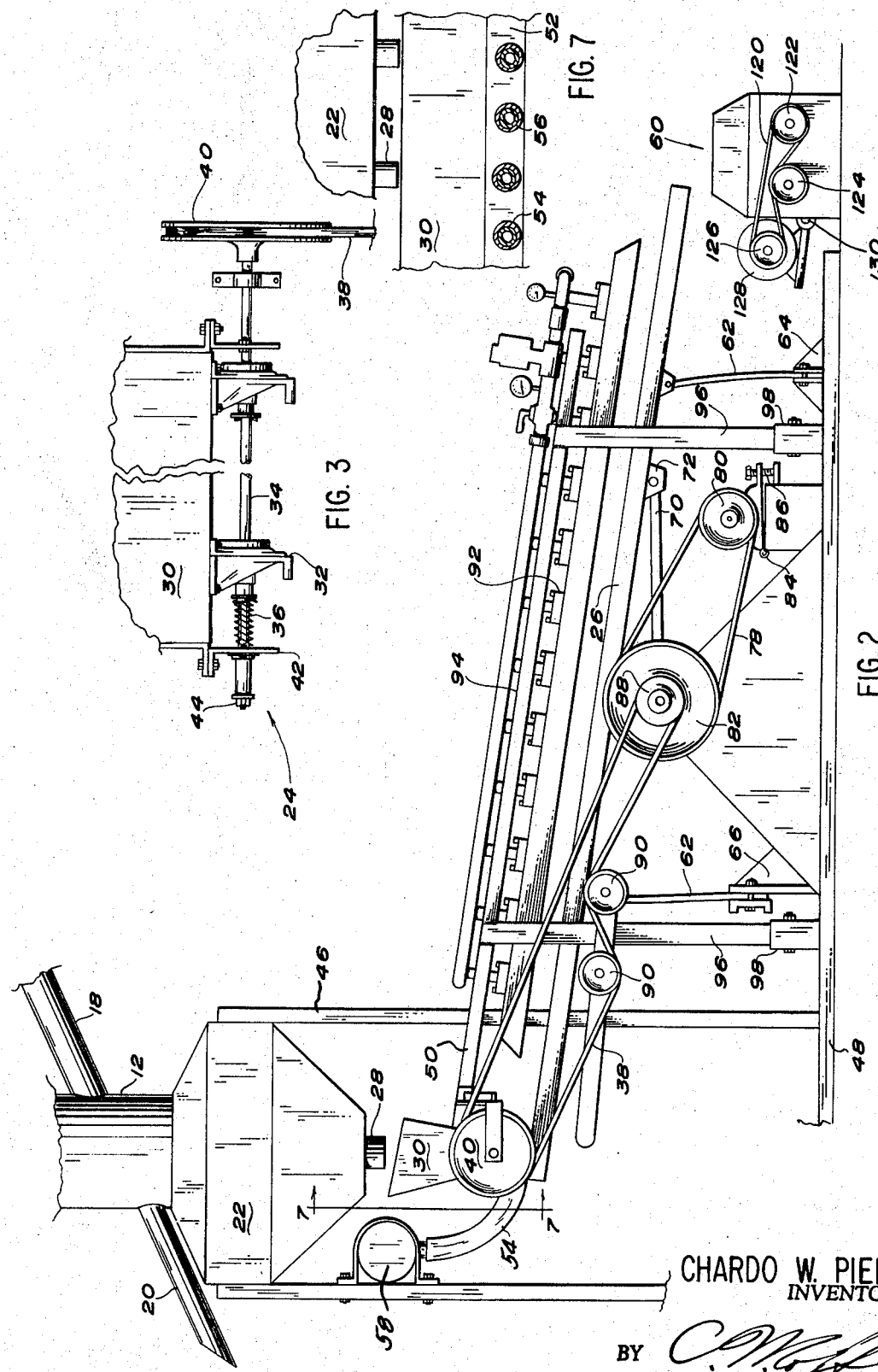

United States Patent Office 3,701,670
Patented Oct. 31, 1972

3,701,670
INFRARED MICRONIZING COOKER
Chardo W. Pierce, Lubbock, Tex., assignor to Chardo Pierce Micronizing Company, Amarillo, Tex.
Continuation-in-part of application Ser. No. 854,693, Sept. 2, 1969, which is a continuation-in-part of application Ser. No. 576,353, Aug. 31, 1966. This application May 6, 1971, Ser. No. 140,834
Int. Cl. A23k; A23l 1/18
U.S. Cl. 99—235 A                 3 Claims

ABSTRACT OF THE DISCLOSURE

Grain is thoroughly cleaned and fed at a predetermined regulated rate on the high end of a tilted metal vibrating plate. As the grain moves down the plate, it is heated at a very fast rate by infrared radiation. The cooked grain is dropped from the low end of the plate into a rolling mill where the soft grain is rolled into flakes.

CROSS-REFERENCE TO RELATED APPLICATIONS

This application is a continuation-in-part of my prior patent application entitled Micronizing, Ser. No. 854,693, filed Sept. 2, 1969, which itself was a continuation-in-part of my application entitled Feed Grain Cooker, Ser. No. 576,353, filed Aug. 31, 1966, now abandoned.

Some of the claims of this application originated in the 1966 application, but a restriction was required in that application and the claims presented herein have not been examined by the Patent Office.

BACKGROUND OF THE INVENTION (1) Field of the invention

This invention relates to the preparation of foods and feeds and, generally, will be concerned with structure for processing cereals and legumes wherein the grains are heated by infrared radiation and then flaked in a rolling mill.

(2) Description of the prior art

Milo is used extensively in the feeding of cattle. The milo grain is particularly difficult to digest probably because of the interior cellular structure, but perhaps also because of the hard nature and the small size of the grain. Often the grain is steam cooked. In addition to the other chemical changes which may occur within the grain because of the heat and moisture added to the grain, the grain is physically changed by softening.

Another way to make the grain more digestible by cattle is by running it through a hammer mill. The dry grain is fed into a hammer mill at ambient temperatures to be cracked so the food value of the grain is more available for digestion.

Reckon, U.S. 3,174,794, has suggested that the grain be steamed, then popped by an open flame and then rolled.

Hale, U.S. 1,839,671, discloses a corn popper for popping corn for human consumption. The corn is popped on a tilted, vibrated plate and the plate is heated by an electrical resistant heater below the plate.

Hill, U.S. 3,180,247, has suggested that corn may be popped for human consumption by infrared heaters.

SUMMARY OF THE INVENTION (1) New and different function

I have found that different seeds, primarily cereal grains or legumes, may be prepared better for consumption by cattle or humans by heating the grain very rapidly by infrared radiation. The grain is heated in its dry state, i.e., it is not previously steamed or boiled before it is cooked by the infrared radiation. The moisture in the grain and the extremely rapid heating of the grain causes the shell or skin of the grain to act as a container for the steam so the grain puffs and becomes soft, turgid and malleable. The heating is discontinued before the grain pops, and then the grain in the soft, malleable, turgid state is immediately rolled and flattened so each grain forms a thin wafer. I do not know all the changes which take place within the grain, particularly milo grain, during this process. Certainly the heat changes the chemical structure of the enzymes, proteins and starches, etc. Rolling the grain while it is soft obviously breaks the outer skin of the grain; also, the membrane which separates the cells or internal divisions within the grain is broken down and is greatly changed thereby. Also, all molds and fungi on the exterior are killed.

I prefer to heat the grain upon a vibrating plate. I have found to do this it is necessary that the grain be exceedingly clean as it is fed onto the plate, otherwise the plate becomes sticky and interferes with proper movement of the grain and proper cooking of the grain before the rolling step.

Although originally, my invention was primarily for cattle fed milo, it will be understood that foods for human consumption may be processed in this manner and by this mechanism. Also, as indicated in the previous patent applications, the machinery and process is also suitable for processing other grains and legumes.

(2) Objects of the invention

An object of this invention is to prepare feed and foods for consumption.

Another object of this invention is to cook and flake legume and cereal grains.

Further objects are to achieve the above with a device that is sturdy, compact, durable, lightweight, simple, safe, efficient, versatile and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a longitudinal, sectional view of one embodiment of this invention.

FIG. 2 is a side elevational view similar to FIG. 1, showing drive mechanisms, etc.

FIG. 3 is a detailed representation, foreshortened, of the feed mechanism.

FIG. 4 is a detail of the adjustment for the roller mill.

FIG. 5 is a representation of a top-plan view of the roller mill.

FIG. 6 is a sectional view particularly showing the surface of a mill roller.

FIG. 7 is an end elevational view taken on line 7—7 of FIG. 2.

DESCRIPTION OF THE PREFERRED EMBODIMENT

This invention will be described using the terminology "grain" and "milo" indicating that it is grain sorghum being processed by the equipment. However, it will be understood that thihs equipment is desirable, with certain adjustments and settings, for handling corn, wheat, barley, rye, oats, rice or all of the other ceral grains. Also, I have used it to process various legumes such as the common varieties of beans and peas.

The grain is fed to the top of the main cleaner 10. The main cleaner is within vertical conduit or pipe 12 through which the grain falls from a conveyor. The cleaner 10 includes two inclined screens. The upper screen 14 is the corse screen and the openings in the screen are large enough to permit the grain to pass through onto the lower screen 16. The coarse material in the grain will be caught on top of screen 14 and will be removed by a suction through suction pipe 18. The lower screen 17 is a fine screen and the openings are smaller than the grain size so only flour or cracked grains or other small trash falls through the second screen, which is to be removed through a chute 20. The good clean grain comes off the bottom of the lower screen 14 and falls into surge bin 22.

The surge bin 22 temporarily stores the grain after it has been cleaned and before it is dropped by precision feeder 24 onto plate 26. The width of the surge bin is about equal to the width of the plate 26. There are five or six spouts 28 depending from the bottom of the surge bin to just above feed hopper 30. When the feed hopper 30 is full, the grain stacks up against spout 28 and no more grain feeds from the surge bin 22 into the feed hopper. If the feed hopper 30 is not full, the grain flows readily from the surge bin 22 into the feed hopper 30.

The precision feeder 24 is located at the bottom of the feed hopper 30. The precision feeder is not of my design. I use a feeder which is commercially on the market by the Tye Manufacturing Company of Lockney, Tex., for a grain drill for planting small grain; therefore, it will be described only in broad terms for the understanding of this invention.

This feeder 24 has a plurality of droppers 32 which are attached to the bottom of the feed hopper 30, each of the droppers being mounted under a hole (not shown) in the bottom of the feed hopper. Each of the droppers 32 has a rotating element (not shown) which is attached to rotatable shaft 34. The shaft is biased by spring 36 to the right, as seen in FIG. 3. The shaft 34 is mounted on suitable bearings and rotated by belt 38 on sheave 40 on one end of the shaft. The other end of the shaft 34 passes through a plate 42 conveniently attached to the hopper 30 and has an adjustment nut 44 threaded thereon. The rate by which the grains are dripped from the feed hopper is regulated by the speed of rotation of the shaft 34. Also, the rate at which the grains are dropped is regulated by the distance between the rotating elements (not shown) and the fixed elements attached to the bottom of the hopper. This space or distance is regulated by the adjustment of the adjustment nut 44. The droppers 32 are spaced at about 10 inch intervals; therefore, there will be six or seven for a plate which was 72 inches width. As shown in the drawing, the surge bin 22 is supported by legs 46 which extend upward from the floor 48 and the feed hopper 30 is attached as a part of the frame 50 which is also attached to the floor. However, the support of these elements is within the skill of ordinary mechanics and does not form a part of this invention.

Wings 52 extend from the bottom of the feed hopper 30 on both sides of the precision feeder 24 and therefore, form an elongated spout or guide to direct the grain as it leaves precision feeder 24 onto the plate 26. Also, the wings 52, forming the funnel to drop the grain onto the plate 26, provide for the final cleaning process which is a plurality of suction hoses 54 attached to nipples 56 onto one of the wings 52. The individual hoses are connected to suction manifold 56. It will be understood that as the grain is stored, sometimes certain fungi or mold forms on the surface of the grain. Also, some of the grain is cracked in handling and flour is spread around on the grain. Then as the grain is moved and one grain rubs against the other from the screens 14 and 16 and in the surge bin 22 and the feed hopper 30 and through the precision feeder 24, much of this fine material, such as flour, is rubbed clean of the grain. Therefore, the suction through the spout or funnel formed by wings 52 provide a good place for removing this loose material and sucking it off through the manifold 56. I prefer to have one of the nipples 56 oposite each of the droppers 32. However, the main thing is to create an air flow up from the bottom of the funnel so as to clean all of the fine material and prevent it from going onto the plate 26.

It will be understood that this process is primarily a cooking process and that the operator should think of the process more as a cooking process than just the handling of raw grain, i.e., the cook must keep the plate 26 clean in much the same way a cook must keep a skillet clean. If the flour and other fine material is permitted to go onto the plate 26 along with the grain, it will form a sticky coating upon the plate and is undesirable. Also when putting the plate into service, it must be "broken in" in much the same way a cook breaks in a new skillet. This can be done by applying vegetable oils to the plate. Also, it has been found that a hot-rolled plate about 0.5 inch thick with the black mill scale thereon is best for the plate 26. After the plate 26 has been broken in by perhaps applying an initial coating of vegetable oil for the first three or four times, the natural oils or waxes upon the outside of the cereal grains will keep the plate in proper condition for proper cooking thereafter.

The plate 26 itself is mounted to slope downward from the top end where the grain is fed by the precision feeder 24 to the lower end where the grain is dropped to roller mill 60. I have found that an angle slope (shown in FIG. 1 as angle $a$) of about 7° or 8° works well. The plate 26 is mounted on a plurality of leaf springs 62. These leaf springs are clamped with suitable clamps 64 which are mounted on the bottom of the frame close to the floor 48 at the lower end and a little taller clamp 66 near the upper end. The leaf springs 62 are attached by conventional ears 68 to the bottom of the plate 26. The plate is vibrated or agitated by pitman 70 which has the one end attached to the bottom of the plate by bearing 72 and the other end journaled to rotating eccentric 74. No attempt is made to match the resilience of spring 62 and the weight of the plate 26 so there is any natural frequency of vibration. If this were done it would be difficult or almost impossible to change the frequency of vibration which is generally set at about 300 cycles per minute.

The eccentricity of the eccentric 74 has been exaggerated in the drawings inasmuch as there is only about $3/16$ of an inch eccentricity and therefore, the amplitude of the plate vibration is about $3/8$ of an inch. The eccentric 74 is mounted upon eccentric shaft 76 which is driven by belt 78 trained over motor sheave 80 and eccentric sheave 82. The motor itself is mounted to the frame by hinge 84 and the other end is controlled by screw 86. The belt 78 is a V-belt and the sheave 80 is an adjustable diameter sheave. Therefore, as the screw 86 is adjusted, the distance from the sheave 80 to 82 is changed and with the changing of the distance between sheaves, the diameter of the sheave 80 changes, thus changing and adjusting the speed of rotation of the shaft 76 which is of course the determinate of the frequency of the vibration of the plate 26. Therefore, it may be seen that the frequency of vibration of the plate 26 may be adjusted.

Feed drive sheave 88 is also mounted upon the shaft 76. The belt 38 is trained not only around the sheave 40, but also the drive sheave 88 and over idler 90, which are mounted to the frame 50. Although not directly shown, the idlers 90 are adjustable upon the frame 50. The feed drive sheave 88 is an adjustable diameter sheave and therefore, as the idlers 90 are adjusted, the belt 38 is drawn into or released from the adjustable diameter sheave 88 thereby adjusting the speed of rotation of the shaft 34 which is driven by the sheave 40. This regulates the rate at which the grain is fed upon the plate 26.

As the grain traverses down the plate 26 because of the incline of the plate and the vibration of the plate, it is rapidly heated by gas infrared generators 92. These generators are well known devices and are commercially available upon the market. One use for these commercial generators is for heating manufacturing spaces by infrared radiation.

The generators 92 are mounted upon subframe 94 and this subframe is attached to posts 96 which telescope into sleeves 98 which are attached to the floor 48. The posts 98 are held in position by set screws or other convenient clamp means. Therefore, the distance from the generators 92 to the plate 26 may be adjusted by raising or lowering the subframe. The distance from the generators 92 to the plate 26 is normally about nine inches, but may be adjusted between 6 inches and 12 inches. The gas valves and gauges and pressure regulators and piping are all carried upon the subframe 94. It is desirable that the generators 92 be mounted also at about a 7° angle so the products of the combustion of the gas are not trapped within the generators, but flow outward. The generators 92 are spaced a short distance one from the other and this space may be filled in by baffles or left open. Of course if it is filled in by baffles, the products of combustion flow all the way to the top side of the plate 26 before they escape into the building. If the baffles are not used or are open, the products of combustion flow readily upward.

I have had good success using twelve rows of generators on eleven (11) inch center. Each row has three generators and each generator (called ray heads in the trade) is rated at 24,000 b.t.u. per hour. The generators produce infrared radiation having a wave length from about 2.5 to 4.0 microns. The plate 26 is about twelve (12) feet long.

As stated before, this process is basically a cooking process; therefore, the operator, if the product is not proper, makes adjustments like a cook. The grain is fed onto the top of the plate 26 and is rapidly heated as it travels down the plate. The infrared rays seem to have an affinity for moisture i.e., they heat the grain from the inside out. The moisture within the grain is heated very rapidly, causing each grain to become soft, turgid, malleable and somewhat dough-like. Of course, if the grain is heated sufficiently, the grain will explode or pop (bean will roast). However, this is not desirable for this process; therefore, it is desired that this not be done. Different adjustments can be made in the frequency of vibration and the rate grain is fed onto the plate or the distance between radiation generators and the plate. Actually, I have found that increasing the gas supply to the radiators does not necessarily produce greater heat and sometimes does not produce beneficial results. The generators should produce an infrared ray and sometimes supplying more gas to the heaters increases the temperature of the ceramic elements of the generators which shortens the wave length and often has an adverse effect. The gas should be regulated to the generator so they have proper infrared ray generation which is generally judged visually. Also, I have found it desirable to place this cooker in a closed building and regulate the pressure within the building by having fans to blow air into the building and then regulate the openings, permitting exhaust from the building. If open ventilation is used, the direction of the wind, the amount the windows are opened will definitely affect the process.

After the grain is heated, it is dropped directly into the rolling mill 60. It is desirable that the transition from heating to rolling mill be made as quickly as possible. I have found that even adding twelve or fourteen inch "tail" to the lower edge of the plate 26 is undesirable.

The roller mill 60 is conventional and quite similar to mills used for milling flour. However, they are adjusted so they roll the grain, thus forming a flake. The rolls are particularly seen as rolls 100 in FIGS. 5 and 6. Referring more particularly to FIG. 6, it may be seen that there are a series of shallow grooves 102. Each of these grooves is about a third deep as it is wide. These grooves are cut upon a helix or an angle $b$. As stated before, these rolls are quite standard for milling purposes and I have found that a "22 tooth Stevens" works well. But, I prefer the angle $b$ to be as great as possible, however, the machines for making these can be set for making angles only up to about 30°. I would really prefer an angle of about 45° so the cross-angle on the wafer is at 90°, i.e., it is at right angles from one side to the other, but as an economic, practical matter, this is not readily available. For small grain, such as milo, the twenty-two or thirty teeth per inch seems to be a desirable range. Generally, the groove will be about twice as wide as the land between grooves. After the grain passes through the rolls 100, it is dropped and carried by conveyor 104 to place of use.

The rolls 100 are each mounted upon a shaft 106 which are mounted in bearings 108 and 110 on either side of the mill 60. As shown in the drawings, the bearing 108 is in a fixed position whereas the bearing 110 may be adjusted so the "nip" or distance between the rolls 100 can be adjusted. There are many ways this adjustment may be made. As shown, this is by making the bottom bolt 112 to the bearing 110 a pivot and having the top bolt 114 clamp within arcuate groove 116. The rolls are limited in their ability to come together by stop 118 in the groove 116. Then the rolls are held together by the tension of the belt 120 which passes around sheave 122 which is mounted upon the shaft 106 which is mounted in the adjustable bearing 110, the belt is trained over the pulley or sheave 124 which is attached onto the other shaft 106. The belt 120 is also trained around the drive sheave 126 or motor 128. The motor itself is pivoted by trunions 130 to the side of the roller mill 160; therefore, the weight of the motor acts to keep the rolls together. However, this is a yieldable pressure so if some foreign object passed between the rolls, the rolls could move apart to permit it to pass, although normally they will be held at whatever spacing provided by the stop 118.

The distance between the rolls 100 is adjusted to obtain the proper wafer as an end product, like a cook adjusting the thickness of his rolled dough. The proper wafer is described in the Sept. 2, 1969, application noted above.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. Machinery for processing seeds comprising:
   (a) a frame,
   (b) a metal plate resiliently supported by said frame,
   (c) means on the frame for vibrating said plate,
   (d) the plate tilted so that one end is lower than the other, (e) means for placing seeds on the high end of the plate, (f) means for cleaning the seeds mounted on the frame adjacent the high end of the plate, said means for cleaning being part of said means for placing seeds on the plate, (g) means for removing the processed seeds from the low end of the plate, and (h) a source of infrared radiation mounted on the frame above the plate for rapidly heating such processing seeds.

2. Machinery for processing seeds comprising:
(a) a frame,
(b) a metal plate resiliently supported by said frame,
(c) means on the frame for vibrating said plate,
(d) the plate tilted so that one end is lower than the other,
(e) means for placing seeds on the high end of the plate,
(f) means for removing processed seeds from the low end of the plate,
(g) a source of infrared radiation mounted on the frame above the plate for rapidly heating said processing seeds, and
(h) a pair of rollers located below the lower end of the plate so the processed seeds fall by gravity from the plate into the rollers, (j) said rollers forming means for flaking the radiated seeds.

3. The invention as defined in claim 2 with the additional limitation of
(k) means for cleaning the seeds mounted on the frame adjacent the high end of the plate, said means for cleaning being part of said means for placing seeds on the plate.

References Cited

UNITED STATES PATENTS

| | | | |
|---|---|---|---|
| 2,428,090 | 9/1947 | Nacher et al. | 99—217 |
| 3,433,468 | 3/1969 | Schoenlaub | 34—164 X |
| 1,839,671 | 1/1932 | Hale | 99—238.1 |
| 3,180,247 | 4/1965 | Hill | 99—238.5 |
| 3,141,777 | 7/1964 | Guidarelli et al. | 99—98 |
| 3,173,794 | 3/1965 | Reckon | 99—81 |
| 3,336,137 | 8/1967 | Hickey | 99—2 |
| 3,368,475 | 2/1968 | Truax | 99—2 |
| 2,592,231 | 4/1952 | Allstott | 99—235 A |
| 3,112,186 | 11/1963 | Davis et al. | 34—164 X |
| 3,412,477 | 11/1968 | Kayatz | 34—164 |

VOLODYMYR Y. MAYEWSKY, Primary Examiner

U.S. Cl. X.R.

34—164; 99—80 R 238; 219—388